(12) United States Patent
Kawabe et al.

(10) Patent No.: US 7,187,867 B2
(45) Date of Patent: Mar. 6, 2007

(54) OPTICAL WIRELESS COMMUNICATION SYSTEM

(75) Inventors: Koji Kawabe, Saitama-ken (JP);
Yoshiki Furukawa, Hadano (JP);
Hiroki Yokoyama, Hadano (JP);
Hiroyuki Oka, Kanagawa-ken (JP);
Daisuke Uchida, Machida (JP);
Kazunori Hirosawa, Hadano (JP);
Kazuyoshi Hibiya, Odawara (JP)

(73) Assignees: Stanley Electric Co. Ltd., Tokyo (JP);
Honda Giken Kogyo Kabushiki Kaisha, Tokyo (JP)

( * ) Notice: Subject to any disclaimer, the term of this patent is extended or adjusted under 35 U.S.C. 154(b) by 850 days.

(21) Appl. No.: 10/385,371

(22) Filed: Mar. 10, 2003

(65) Prior Publication Data

US 2003/0170031 A1 Sep. 11, 2003

(30) Foreign Application Priority Data

| Mar. 11, 2002 | (JP) | ............... 2002-065231 |
| Mar. 11, 2002 | (JP) | ............... 2002-065232 |
| Apr. 10, 2002 | (JP) | ............... 2002-107835 |
| Apr. 10, 2002 | (JP) | ............... 2002-107836 |

(51) Int. Cl.
*H04B 10/00* (2006.01)
(52) U.S. Cl. .................. 398/126; 398/97; 398/62
(58) Field of Classification Search ............. 398/118, 398/128, 70, 71, 79, 99, 59, 58, 91, 126, 398/97, 62; 359/172, 173; 370/312
See application file for complete search history.

(56) References Cited

U.S. PATENT DOCUMENTS

| 5,349,463 A | | 9/1994 | Hirohashi et al. |
| 5,490,139 A | * | 2/1996 | Baker et al. ............. 370/312 |
| 5,917,629 A | * | 6/1999 | Hortensius et al. ......... 398/99 |
| 5,946,118 A | * | 8/1999 | Flaherty .................. 398/79 |
| 6,188,914 B1 | | 2/2001 | Chheda ................... 455/562 |
| 6,314,305 B1 | | 11/2001 | Solondz et al. ........... 455/562 |
| 6,684,030 B1 | * | 1/2004 | Taylor et al. ............. 398/59 |
| 2002/0048071 A1 | * | 4/2002 | Suzuki et al. ............ 359/173 |

FOREIGN PATENT DOCUMENTS

EP 0637151 2/1995

(Continued)

*Primary Examiner*—David C. Payne
(74) *Attorney, Agent, or Firm*—Carella Byrne Bain et al; Elliot M. Olstein; William Squire (57) ABSTRACT

The present invention provides a bilateral communication network system, particularly, a optical wireless communication system communicating information frames via an optical node mounted on a mobile object and a plurality of optical repeaters connected to a wired network, which can prevent transfer performance from deteriorating without increasing frames to be transferred. The optical wireless communication system is constituted as follows. A plurality of the optical repeaters having functions to switch information frames are attached to a ceiling. The optical node bilaterally communicating with the optical repeaters are mounted on a moving object such as a robot, a vehicle or the like. Information frames including address information of the optical node are periodically transmitted from an information processor connected to the optical node via optical wireless communication. The address information is continuously transmitted from the optical repeaters to a trunk network, and a filter function is arranged in the trunk network so as to make only one frame effective among frames with the same content.

6 Claims, 11 Drawing Sheets

FOREIGN PATENT DOCUMENTS

| | | |
|---|---|---|
| EP | 0814625 | 12/1997 |
| EP | 1079550 | 2/2001 |
| JP | 8139675 | 5/1996 |
| JP | 8139678 | 5/1996 |
| JP | 10-98433 | 4/1998 |

* cited by examiner

OPTICAL WIRELESS COMMUNICATION SYSTEM

BACKGROUND OF THE INVENTION

1. Field of the Invention

The present invention relates to a bilateral communication system by a optical wireless communication, particularly relates to a optical wireless communication system where information frames are exchanged with an optical node mounted on a mobile object via a plurality of optical repeaters arranged in a wired network system.

2. Brief Description of the Related Art

Figure 6:
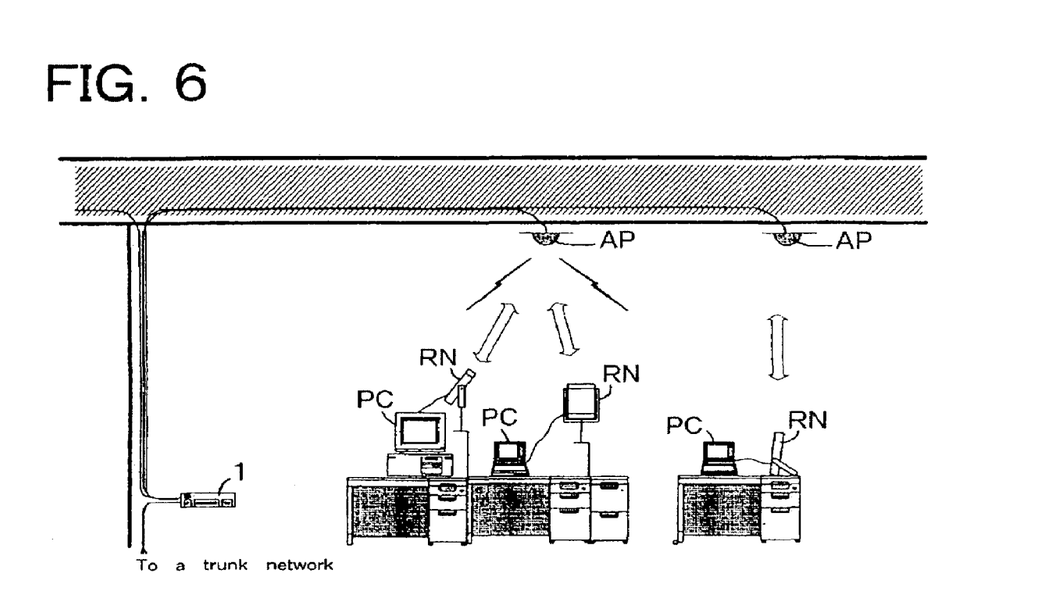
FIG. 6 shows a structure of an optical wireless network.

Recently a wireless optical network (LAN) utilizing infrared rays was proposed and it has put to a practical use. FIG. 6 shows an outline of a system arrangement of such wireless optical networks utilizing infrared rays.

In the system illustrated in FIG. 6, a plurality of optical repeaters AP functioning as access points, are arranged on a ceiling or walls of a building. These optical repeaters AP are connected to a trunk network (not shown in FIG. 6) via a transit post 1, sometimes called "a switching hub", and optical repeaters AP optically and mutually communicate with optical nodes RN arranged in the building. Each node is connected to a computer PC used as an information processor such as a personal computer or the like.

The above-mentioned optical repeaters AP and optical nodes RN respectively have photodetectors and photo-emitting devices so that the optical repeaters AP and optical nodes RN can mutually communicate. Optical repeaters AP can communicate with a plurality of optical nodes RN, but usually they are connected to a wired network system (fixed system) so as to constitute a large scaled communication system. If optical nodes RN are utilized as mobile units, a quite flexible communication service can be provided.

One optical node RN is usually connected to one computer PC via an interface, which usually employs a versatile wire LAN format. Consequently, the computer PC can be transferred quite easily (can attain a mobile circumstance) without losing same communicating conditions as those of the wired network. Sometimes a plurality of computers PC are connected to one optical node RN. When the interface for optical communication is built in the computer PC, a more simple communicating system is attained.

Figure 7:
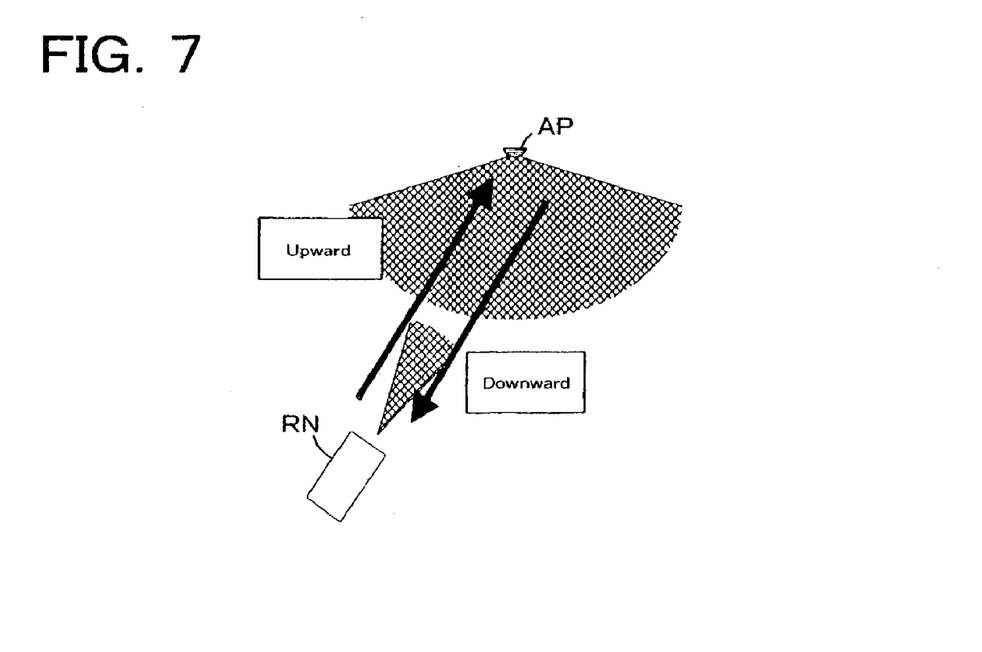
FIG. 7 shows a relation between photo-detecting/emitting areas of an optical repeater and an optical node.

FIG. 7 shows photo-detecting/emitting areas (communication areas) of the optical repeater AP and the optical node RN. Hereinafter, a communicating direction from the optical repeater AP to the optical node RN is defined as "a downward direction" and the opposite direction is defined as "an upward direction".

As shown in FIG. 7, the photo-detecting/emitting areas of the optical repeater AP are usually set wide directive angles for more flexible arrangements. On the other hand, the photo-detecting/emitting areas of the optical node RN are set narrow directive angles so as to raise an emitting distance ratio against an inputted power by raising a photo-detective sensitivity and an emitting power.

It is desirable to set the same directional angles for the photo-detecting area and photo-emitting area (namely, for upward and downward directions). Because once a bilateral LAN is employed, transmitted signals should be received without fail. And because a congestion of information in the system is aggravated when redundant information is received, so that a performance of the LAN is deteriorated. It is also desirable to coincide the two areas from a point of a power efficiency in the LAN system.

Although in the above-mentioned conventional optical wireless communication system, the computer connected to the optical node can be used as a mobile unit, usually the computer is considered a fixed unit to a determined position. When the computer is mounted on a mobile object such as a conveyor, a robot or the like, and is required to communicate while moving, the narrow directional angle of the optical node causes a problem. As measures against the problem, two solutions are probable.

A divided photodiode is employed as a photo-detecting member of the optical node and an automatic servomechanism is attached to the optical repeater so as to face directly to the photo-detecting/emitting front of the optical node.

Both directive photo-detecting/emitting angles of the optical node are set wide.

When solution (1) is employed, very complicated mechanism and controlling system are required for attaining the automatic servomechanism. As a result, volume, weight and required power are increased in the system, which will be controversial factors when this solution is employed in the mobile object. Consequently, this solution would require a much higher cost.

Further if wider photo-detecting/emitting areas are attained by employing a plurality of optical repeaters, the more fatal following problem will be caused. One optical repeater cannot be handed over to other optical repeaters, unless an additional detecting system is required in the optical node for recognizing other optical repeaters except the optical repeater currently communicating with the optical node.

Figure 8A:
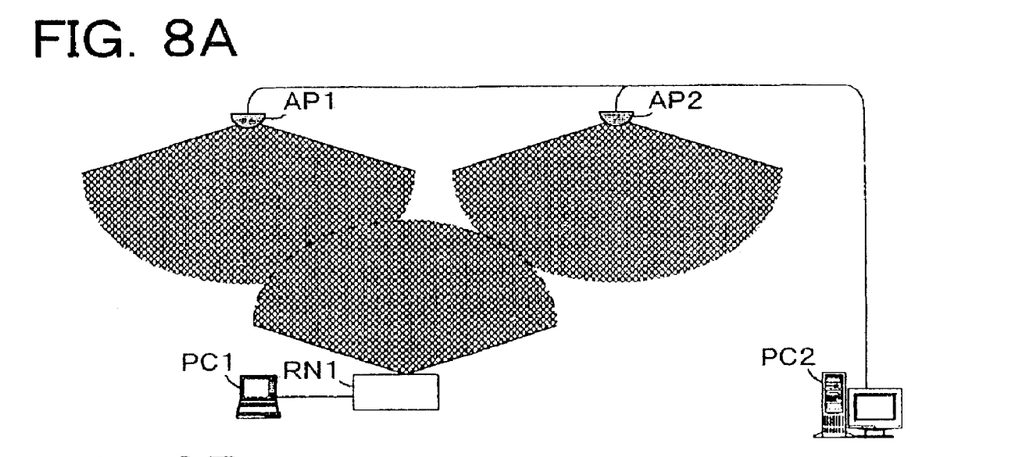
FIGS. 8A and 8B show relations among photo-detecting/emitting areas of a plurality of optical repeaters and an optical node attached to a mobile body by the present invention.
Figure 8B:
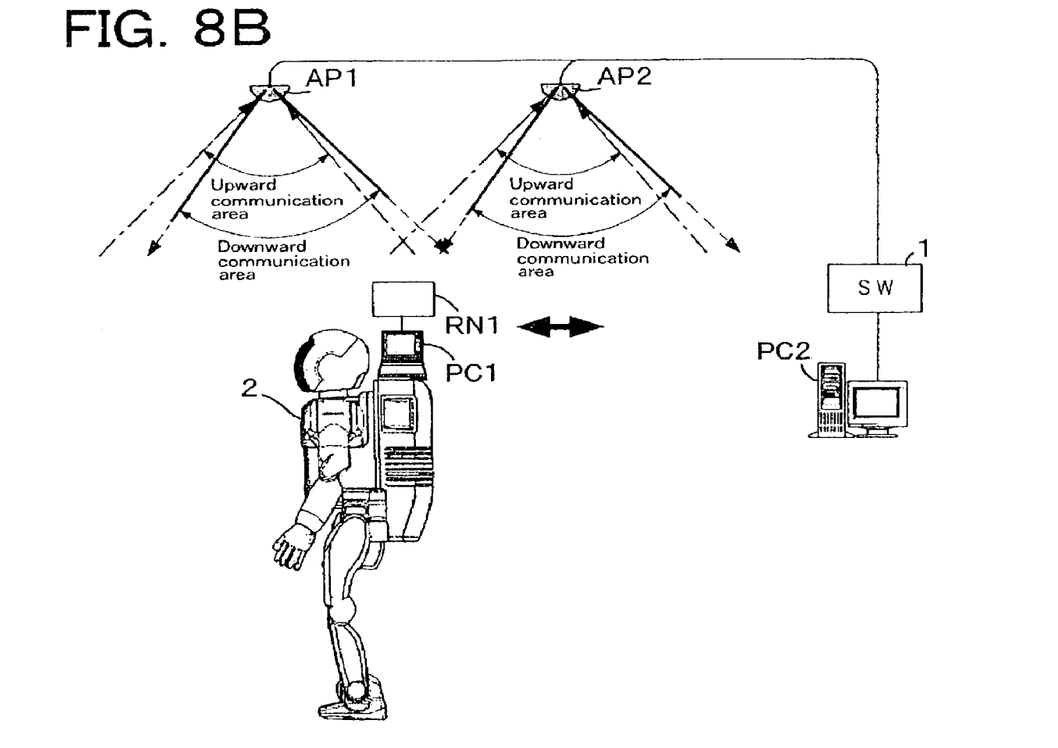

Consequently, solution (2) for setting more wide directive angles of the optical node, is considered to be more effective. An example of the wide directive angles is shown in FIGS. 8A and 8B. Reference characters "AP1" and "AP2" in these figures are optical repeaters and a reference character "RN1" is an optical node connected to a computer PC1, which is mounted on a mobile object 2, constituted as a self walking robot. A reference character "PC2" is a computer equipped in a trunk network.

Since a light ray is diffused when transmitted in a space, energy density of the transmitted ray is attenuated exponentially. Therefore, a plurality of optical repeaters AP1, AP2 . . . are arranged so as to widen their combined directive angles for attaining a wide ranged service area.

FIGS. 8A and 8B are schematically illustrated, but actually the following points should be considered.

Boundaries among communicating areas of respective optical repeaters and optical nodes are not distinctively recognized, but can be defined as areas having an error rate lower than a predetermined error rate. In other words, although there are some areas where communication capability is uncertain, the optical wireless communication system is described as a system having distinctive boundaries for easier understanding.

In the bilateral communication system consisting of an upward transmission and a downward transmission, a communicable area (or distance) is determined by a photo-emitting power of the photo-emitting device and a detecting sensitivity of the photo-detector. Actually a communicable area of the upward transmission area does not coincide with the downward transmission area (see FIGS. 9A and 9B).

Figure 9A:
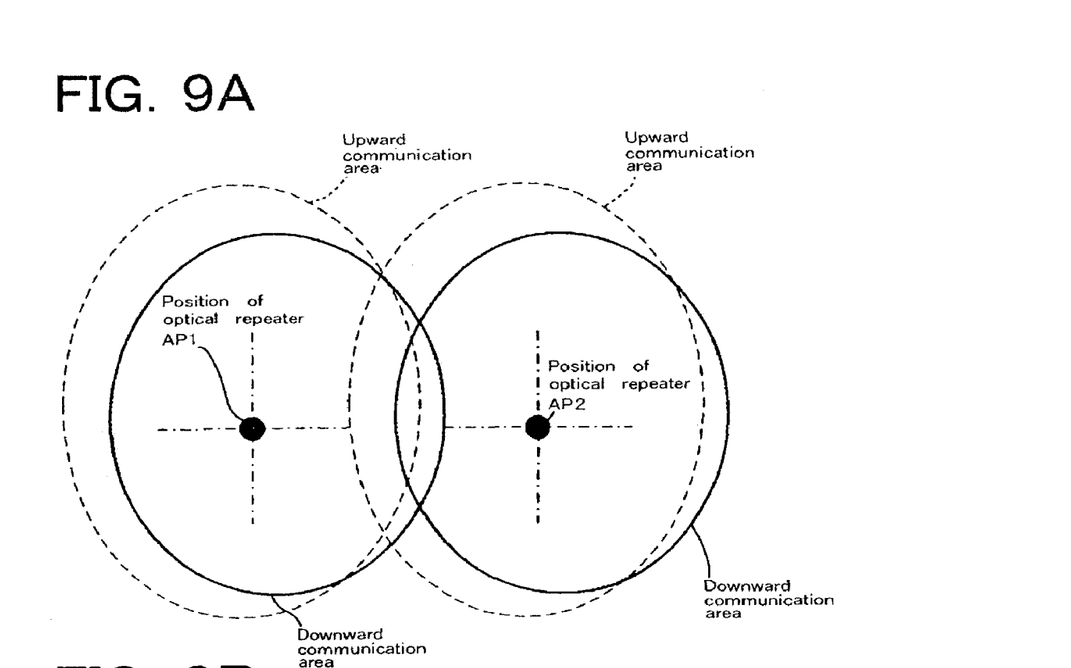
FIGS. 9A and 9B show a relation between photo-detecting/emitting areas of two optical repeaters in a conventional optical communication system.
Figure 9B:
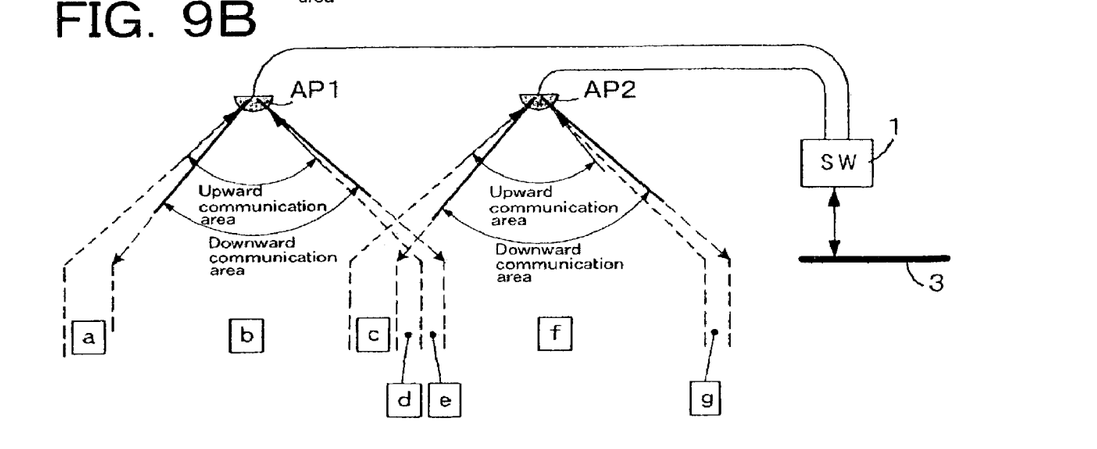

Hereinafter communication problems caused by the above-mentioned points (a) and (b) are explained by referring to FIGS. 9A, 9B and TAB. 1. FIGS. 9A and 9B show upward and downward transmitting areas in detail. Transmission statuses in respective zones a to g in FIG. 9B, are explained in TAB. 1. A reference numeral "3" in FIG. 9B is a trunk network.

TABLE 1

| Zone | Transmission Status | Usable as area For transmission? |
|---|---|---|
| a | Only upward to AP1 is Transmittable. | No |
| b | Upward to/downward from AP1 are transmittable. | Yes |
| c | Upward to/downward from AP1 and upward to AP2 are transmittable. | Yes, but sometimes Faults will occur. |
| d | Upward to/downward from AP1 and AP2 are transmissible. | Yes |
| e | Downward from AP1 and Upward to/downward from AP2 are transmittable. | Yes |
| f | Upward to/downward from AP2 are transmittable. | Yes |
| g | Only downward from AP2 is Transmittable. | No |

As shown in FIGS. 9A and 9B, since photo-detecting/emitting angles of the optical node RN1 are already widened, excellent transmission statuses of the area are attained by combined effects of the optical repeaters AP1, AP2 and the optical node RN1.

In order to attain a wide communication area by utilizing a plurality of the optical repeaters AP1 and AP2, it is necessary to place the optical repeaters AP1 and AP2 apart from each other as far as possible so as to overlap respective areas. But not to place too far apart such that no-transmittable zones between the optical repeaters are caused. Hereinafter the situations where the optical node RN1 is situated in overlapped zones (zones c, d and e in FIG. 9) are explained.

An upward transmission of a emitted light signal from the optical node RN1 is detected by the optical repeater AP1 or AP2, from which the signal is transmitted to the trunk network 3. If signals from the optical repeaters AP1 and AP2 are simultaneously transmitted to the trunk network 3, there are probabilities that a data collision will occur and data will be destroyed. In order to avoid such probabilities, it is effective to transmit signals via a transit post 1 equipped with a memory buffer.

The transit post 1 has functions to receive frames (data) from any directions without destroying the frames and to administer sending source addresses of the frames and final destination addresses of the frames so that the frames can be transmitted only to a port where a receiver exists. Consequently, fatal faults do not occur as far as upward transmissions to the optical repeaters are concerned, even if transmittable areas of the optical repeaters are overlapped.

Frames from the trunk network 3 are transmitted downward to the optical repeater AP1 or AP2 where the receiver exists by the above-mentioned functions of the transit post 1. However when the receiver exists (namely the optical node RN1) in the mobile object 2 and even if frames are transmitted to the repeater AP1 or AP2 where the frames existed before, there is a probability that the optical node RN1 to be functioned as the receiver moves out of the transmittable area.

In addition, there is also a problem that an upward transmittable area and a downward transmittable area do not coincide with each other.

In other words there are zones a and g shown in FIG. 9B where only one way transmission is possible, consequently these zones are not usable as the transmittable area. Since in zones b and f only either the optical repeater AP1 or AP2 is bilaterally transmittable, these zones are usable as the normal transmittable area without causing any problems.

Since in zone d both optical repeaters AP1 and AP2 are bilaterally transmittable, when the transit post 1 selects either the optical repeater AP1 or AP2, transmitted frames from the optical repeater AP1 or AP2 arrive at the trunk network 3 without fail.

Since in zone e transmitted frames arrive at only the optical repeater AP2, the transit post 1 selects the optical repeater AP2 as downward transmission, the transit post 1 can bilaterally communicate with the optical repeater AP2.

Zone c is the most controversial zone. Transmitted (emitted) frames in this zone arrive at both optical repeaters AP1 and AP2. A current position of the mobile object 2 equipped with the optical node RN1 is judged as unidentifiable from administration tables (including address tables) in the transit post 1 due to its administrative function. (Which means the transit post 1 transmits frames downwardly to the optical repeater, which recognizes the optical node most currently).

However, even when frames transmitted (emitted) from the optical repeater AP2 do not arrive at the optical node RN1 at zone c, since zone c is out of the downward transmission area of the optical repeater AP2. Although zone c is situated in an overlapped area of optical repeaters AP1 and AP2, communication faults might occur.

Figure 10:
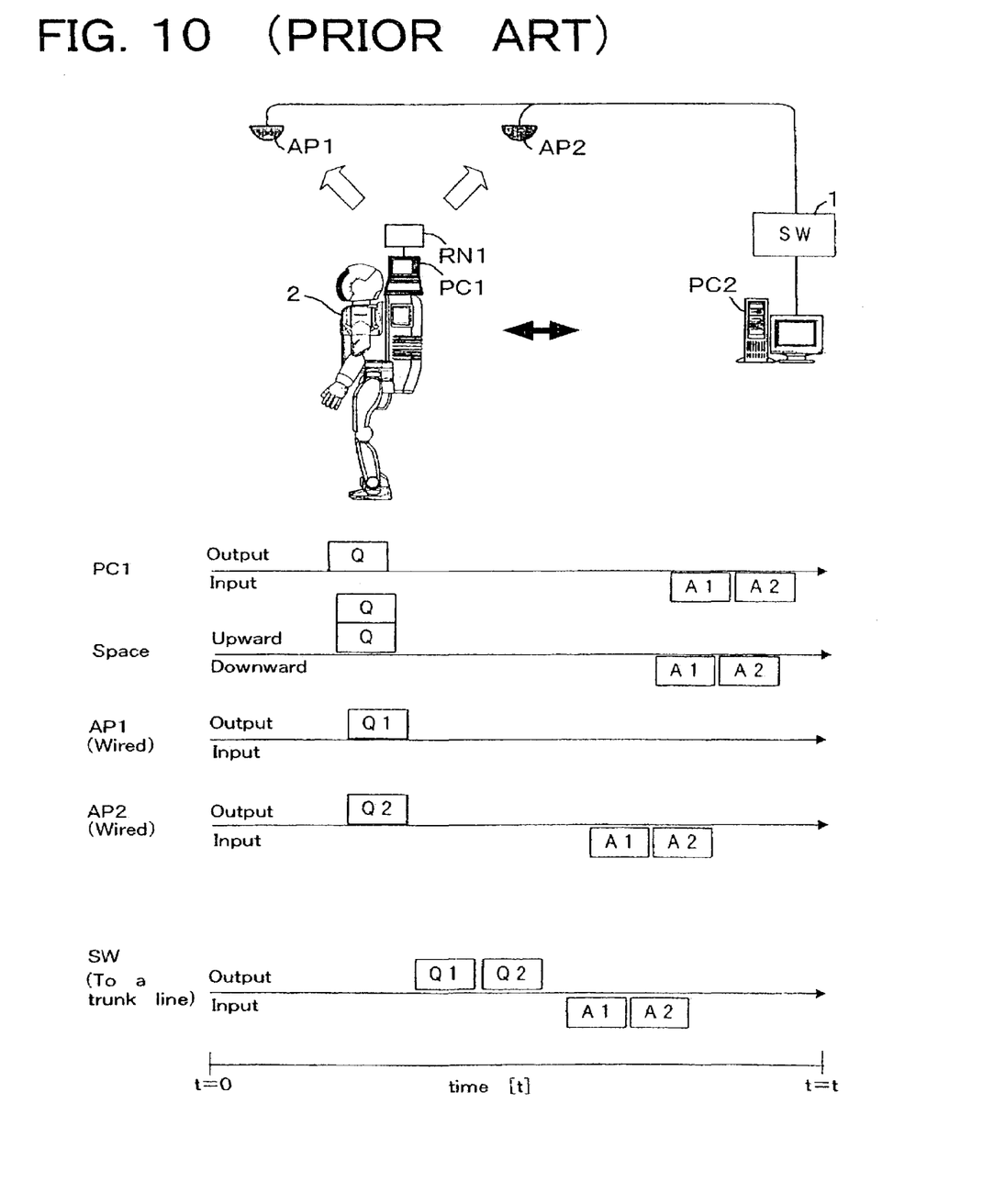
FIG. 10 shows an example of conventional network communication.

Hereinafter, communication problems in a conventional network system are explained. An example of network communication by the above-mentioned system is illustrated in FIG. 10.

In LAN systems, all data are divided into frame units and communicated. By referring to FIG. 10 a simple communication example, where an inquiry frame Q is transmitted from a computer PC1 to a computer PC2 and then the computer PC2 returns a response frame A to the computer PC1, is considered.

The inquiry frame Q transmitted from the computer PC1 is converted into an optical frame by the optical node RN1 and emitted into space. In this case, a photo-emitting angle of the optical node RN1 is set a wide directional angle so that the optical frame transmitted from the optical node RN1 can be received by both optical repeaters AP1 and AP2. The optical frame received by the optical repeaters AP1 and AP2 is converted into respective electrical signal frames and transmitted to the transit post 1 via a wire. In this stage, electrical signal frames corresponding to the number of the optical repeaters which receive the inquiry frame Q from the node RN1, are generated.

Transmitting timings of electrical signal frames from the optical repeaters are determined respectively by optical repeaters AP1 and AP2, so that sometime the timings are delayed each other, but some other time the timings coincide with each other.

The transit post 1 can receive both electrical signal frames from respective optical repeaters AP1 and AP2. Both received electrical signal frames are transmitted to existing ports in the computer PC2 based on receivers' address information included in the electrical signal frame. Since the transit post 1 cannot transmit two frames to the same port simultaneously, either one of frames is transmitted previously based on received orders and processed timings of the received frames. Usually an address table in the transit post 1 is maintained according to the sender's address of the frame transmitted lastly.

In the example illustrated in FIG. 10, since the transit post 1 lastly transmits arrived electrical signal frame from the optical repeater AP2 to the computer PC2, the address table in the transit post 1 recognized that the computer PC1 is connected to (a port for) the optical repeater AP2.

Then the computer PC2 returns response frames A1 and A2 respectively to inquiry frames Q1 and Q2 from the optical repeaters AP1 and AP2. In this case, if a protocol (for example TCP/IP) for administrating frame number is employed, a protocol stack in the computer PC2 is confused so that transmitting performance is remarkably deteriorated. Even if a protocol not for administrating frame number is employed, transmitting performance is also deteriorated due to a redundant frame is transmitted in the network as illustrated in FIG. 10.

In other words, since the same frames are transmitted from the optical repeaters AP1 and AP2 to the trunk line, transmitting performance is deteriorated.

Figure 11:
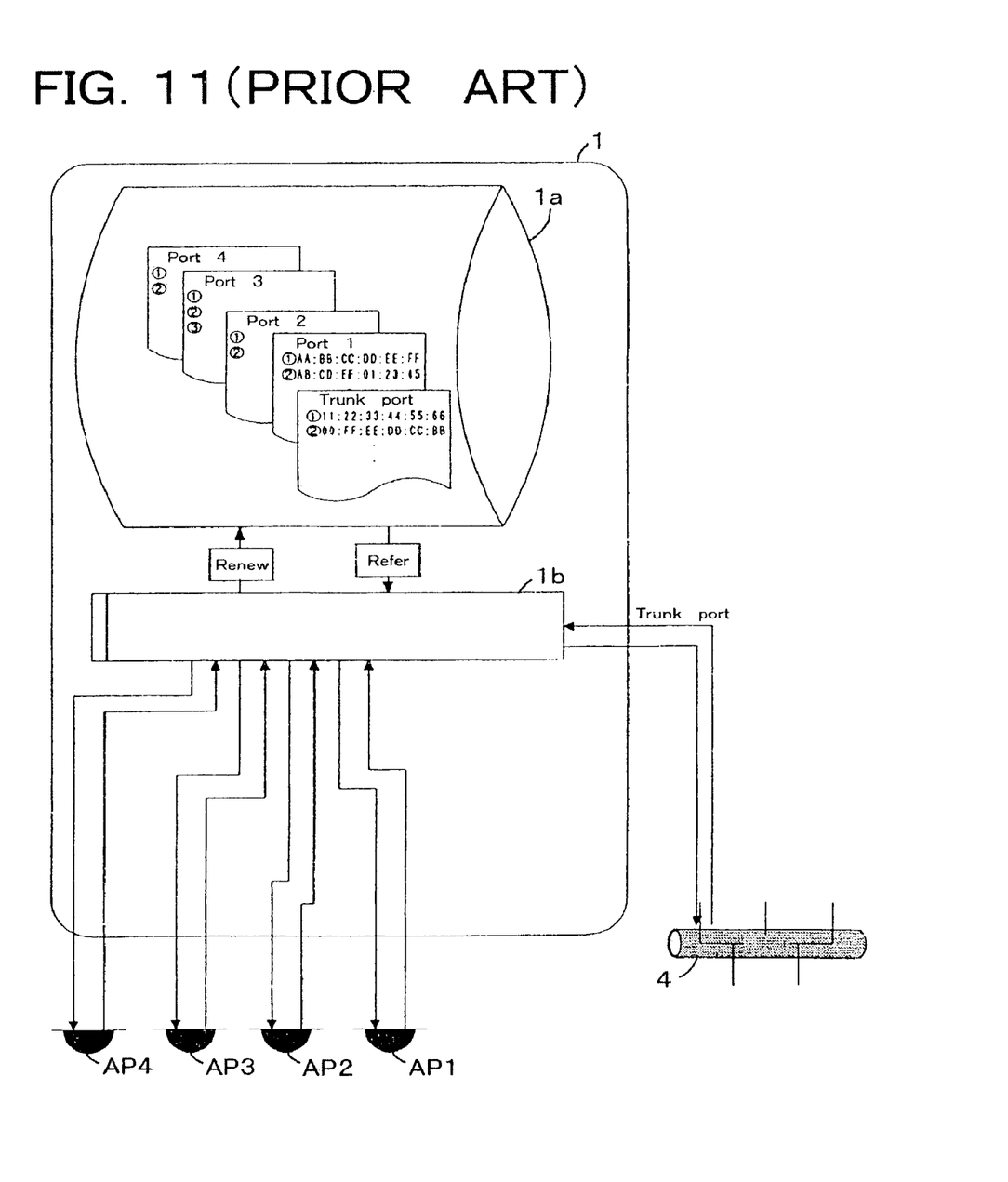
FIG. 11 is a block diagram showing a functional structure of a conventional switching hub.

A functional framework of the transit post (switching hub) 1 is illustrated in FIG. 11. The transit post 1 is slightly different from a switching hub (such as 10BASE-T, 100BASE-T or the like) usually employed in a wired LAN such that the transit post 1 has an address administration table 1a and a frame sorting unit 1b.

When the Ethernet® 4 connected to the trunk port and optical repeaters AP1 to AP4 illustrated in FIG. 11 are employed in an optical wireless LAN, they should have different functions from the wired LAN. Hereinafter required functions are explained.

In the beginning no data are registered in the address administration table 1a. When any one of ports in the transit post 1 is connected to a network, frames are transmitted from the Ethernet® 4. As mentioned before, data in the Ethernet® 4 are divided into frames having a certain length.

First of all addresses peculiar to receivers and senders are added to frames. If a receiver's address in a frame arriving at the transit post 1, is identified as the address registered in the address administration table 1a, the frame is transmitted only to a port corresponding to the registered address. If the receiver's address is not found in the table 1a, the frame is not transmitted to all ports. As a result, since frames are not transmitted to ports having no corresponding registered addresses, congestion in the network is mitigated so that performance is improved. However, when the receiver's address is broadcast information, frames are transmitted to all ports.

Senders' addresses of all frames passing through the transit post 1 are checked according to the address administration table 1a. If a sender's address is not registered in the table 1a, it is registered in the table together with a corresponding port number. When the sender's address is different from a registered port number, the structure of the network is considered to be changed, and the registered number is deleted. Then a new port number is registered instead. In some cases, time information (time stamp) of the registered time is also memorized. When the registered time is judged to elapse more time than a predetermined time, registered data may be deleted.

In addition, there are special frames called "Multi-cast" and "Broad-cast". Receivers' addresses are not specified in these special frames. When the transit post 1 receives these special frames, they are transmitted to all ports.

Functions described above are the same ones in the optical wireless LAN and the wired LAN. However, the optical wireless LAN had better have a function to transmit an inputted frame to the same port to which an optical repeater is connected. Because, when a plurality of optical nodes are positioned in the same communication area of one optical repeater, frame transmission among the plurality optical nodes are required.

The wired LAN is constituted such that when one node transmit a frame, all other nodes connected to the LAN receive the transmitted frame. Folded transmissions are not necessary in the wired LAN when a receiver and a sender happens to be the same port. On the other hand in the optical wireless LAN, each optical node receives (recognizes) a light emitted form an optical repeater, but it does not always receives emitted lights from other optical nodes due to mutual geometrical relations among the optical nodes. Accordingly, folded transmissions by the optical repeater are required. If the folded transmissions are transmitted, functions of the wired LAN will be deteriorated (a frame congestion will be caused).

Since it is very likely that optical nodes in the wireless LAN move in complicated manners, a high processing speed is required in order to renew the address administration table 1a.

SUMMARY OF THE INVENTION

The present invention is carried out in view of the above-mentioned problems so as to provide an optical wireless communication system capable of preventing addresses in an address table from vanishing while the optical node is moving, even when both photo-detecting/emitting angles of optical repeaters and optical nodes are set wide, so that a relation between a mobile object and a network can be kept in the same manner as in the wired communication system. The present invention also provides the optical wireless communication capable of being operated normally, even when communication areas of a plurality of the optical repeaters are overlapped.

Further the present invention provides a optical wireless communication system capable of preventing transmission performance being deteriorated without increasing the number of frames to be transmitted.

One embodiment by the present invention is the optical wireless communication system for constituting a bilaterally communicating network comprising: a plurality of optical repeaters having a function to switch information frames, and a mobile optical node bilaterally communicating with said optical repeaters, wherein: a communication area from each optical repeaters to the optical node is set wider than a communication area from the optical node to each optical repeaters such that the latter communication area is included in the former communication area. Information frames including address information of the optical node are periodically transmitted from an information processor connecting the optical node to the optical repeaters via wireless optical transmission. Further, each communication area of the optical repeaters is arranged so as to overlap to other communication areas of the optical repeaters in a predetermined zone.

In other embodiment by the present invention, information frames including address information of said optical node are periodically transmitted from an information processor connecting the optical node to the optical repeaters via wireless optical transmission; the address information is continuously transmitted from the optical repeaters to a trunk network, and a filter function is arranged so as to make only one frame effective among frames with the same content.

DETAILED DESCRIPTION OF THE PREFERRED EMBODIMENTS

Hereinafter embodiments are explained in detail by referring to drawings.

(Embodiment 1)

In the present embodiment, photo-detecting/emitting areas of the optical repeaters and the optical node are set wide directional angles. A plurality of the optical repeaters are arranged such that the photo-detecting/emitting areas of neighbor optical repeaters are overlapped each other, as satisfying the following conditions.

Addresses in an address table are prevented from vanishing, while the mobile object equipped with the optical node is moving so that the same functions as in a wired network are kept in the present wireless network.

Problems mentioned in "Brief Description of the Prior Art" occurring in overlapped areas are solved so that the wireless network performs normally even when photo-detecting/emitting areas of a plurality of optical repeaters are overlapped.

In order to attain the above-mentioned conditions, the present embodiment is constituted as follows.

A downward transmitting area is always set wider than an upward transmitting area. In other words, if the upward communication is transmissible, the downward communication is transmissible without fail.

Frames are emitted (transmitted) from the optical node of the mobile object periodically, so as to track the mobile object which moves even at its maximum speed. A periodical emitting interval is determined by taking the maximum speed of the mobile object and an extent of the overlapped areas of the optical repeaters into consideration. The overlapped extent may be determined by taking the maximum speed and the size of the transmitting area into consideration.

Figure 1A:
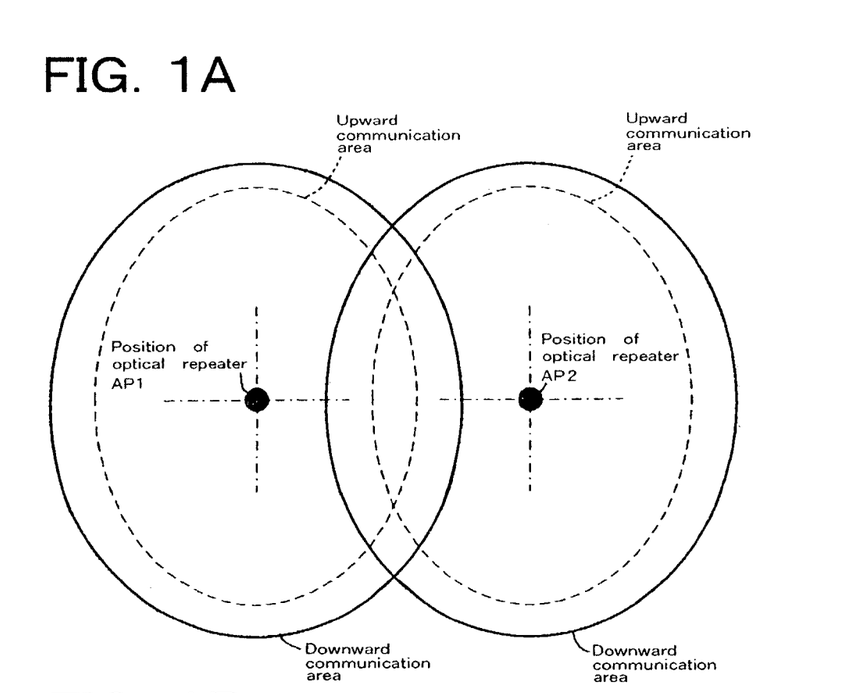
FIGS. 1A and 1B show an arrangement of embodiment 1 by the present invention.
Figure 1B:
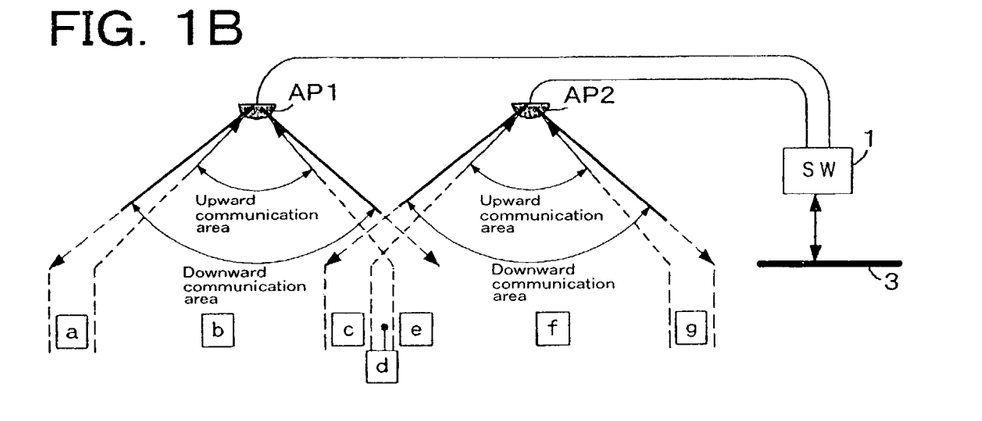

FIGS. 1A and 1B show the arrangement of the embodiment 1, particularly illustrate detailed photo-detecting/emitting areas of the optical repeaters AP1 and AP2. As shown in the figures, upward communication (photo-detecting) areas of the optical repeaters AP1 and AP2 are always set narrower than downward communication (photo-emitting) areas of these optical repeaters. Thus, a downward communication is guaranteed without fail in an area where an upward communication is transmissible.

More specifically, the number of photo-emitting elements and photo-emitting powers of the optical repeaters AP1 and AP2 are increased, and photo-emitting directional angles of the optical repeaters AP1 and AP2 are widened. On the other hand a photo-emitting directional angle of the optical node is narrowed (a photo-emitting power is lowered). Alternatively, field stops (irises) may be arranged on photo-detecting members of the optical repeaters AP1 and AP2. Either way is applicable to the present embodiment, and a combination of two ways is also applicable. Thus communication faults in overlapped areas are eliminated as shown in TAB. 2.

TABLE 2

| Zone | Transmission Status | Usable as area for transmission? |
|---|---|---|
| a | Only downward from AP1 is transmittable. | No |
| b | Upward to/downward from AP1 are transmittable. | Yes |
| c | Upward to/downward from AP1 and downward from AP2 are transmittable. | Yes |
| d | Upward to/downward from AP1 and AP2 are transmissible. | Yes |
| e | Downward from AP1 and Upward to/downward from AP2 are transmittable. | Yes |
| f | Upward to/downward from AP2 are transmittable. | Yes |
| g | Only downward from AP2 is Transmittable. | No |

If a space among the optical repeaters AP is set too narrow, if an overlapped communication area between the two neighboring optical repeaters is too large and if a difference between the upward and the downward communication areas is too large, costs for arranging the optical repeaters AP are increased, which results in wasting emitted power in the system.

Therefore, it is desirable to properly determine the space among the optical repeaters AP, the overlapped communication area between the two neighboring optical repeaters and the difference between the upward and downward communication areas according to the moving speed of the mobile object 2, a setting height of the optical repeaters AP, a distance between the optical node and the optical repeaters AP and a photo-emitting/detecting capability of the system and the like. If the communication area is relatively narrow and the photo-detecting/emitting capability is low against the fast moving optical node RN, it is necessary to set the space among the optical repeaters AP narrow and to set the overlapped communication area wide. If the photo-detecting/emitting capability is high and capability to process high frequency frames is high, the space among the optical repeaters AP and the overlapped communication area can be set narrow.

The communication area is determined properly according to arranged statuses of the optical repeaters AP and moving characteristics of the optical node RN and the like. A shape of the communication area is determined according to photo-transmitting characteristics, structures of the photo-emitting members or the like in the system. For example the communication area is formed in a cone or pyramid.

Figure 2:
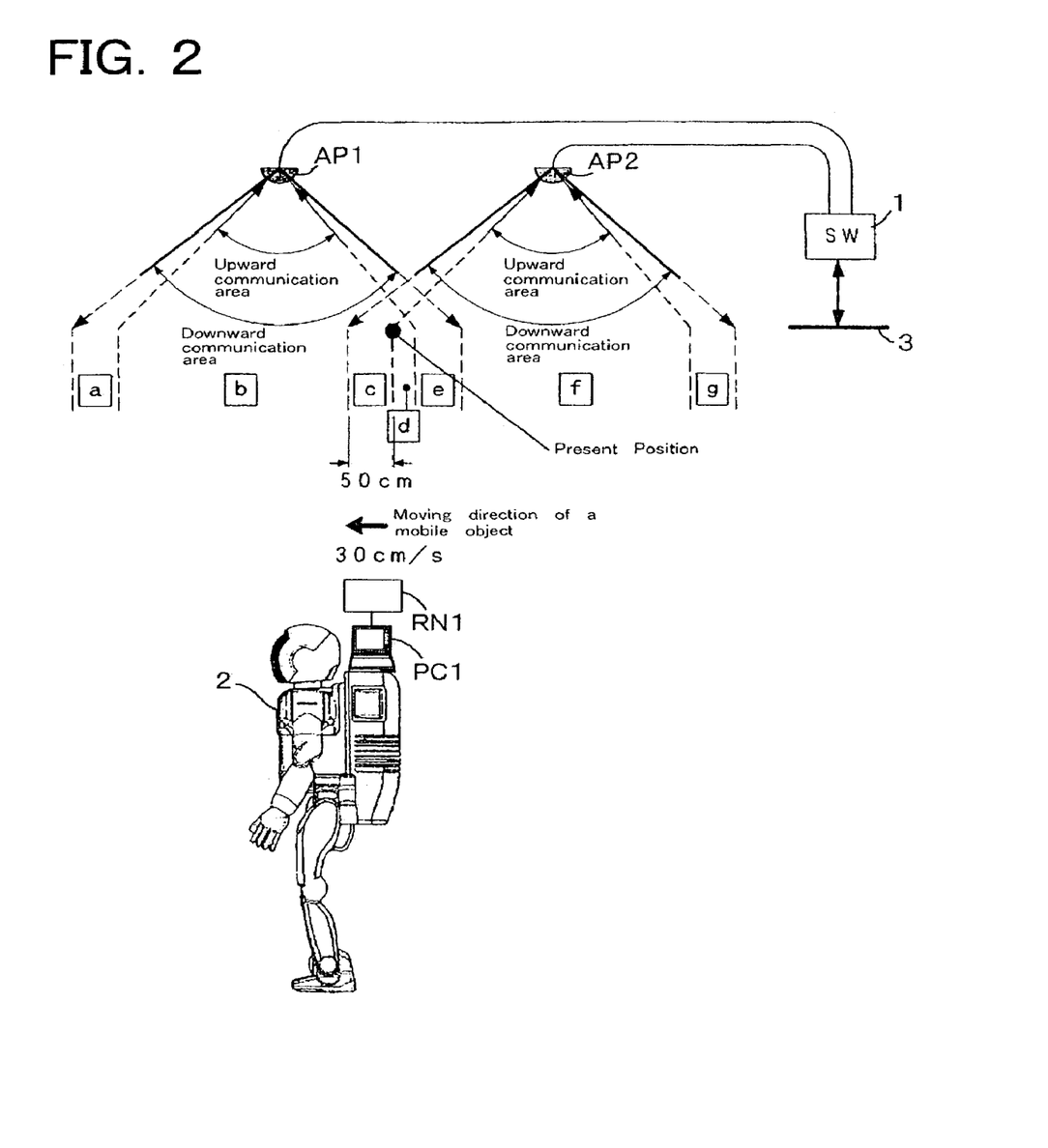
FIG. 2 is an explanatory view illustrating a mobile object (robot) equipped with an optical node in embodiment 1.

FIG. 2 illustrates a situation where the optical node is moving. An optical node RN1 connected to a computer PC1 functioning as data processing unit, is mounted on a mobile object 2 such as a robot or the like. Optical repeaters AP1 and AP2 having functions to switch information frames are attached to a ceiling or a wall of a building. Since other arrangements or components are same as the conventional communication system, further explanation is omitted.

Hereinafter, periodical photo-emissions (transmissions) from the optical node RN1 is explained. In a LAN (network communication among computers), all information is transferred as information units called "frames". Addresses peculiar to a sender and a receiver of a frame are always added to the frame. Consequently, if the computer PC1 connected to the optical node RN1 periodically transmits information frames including address information, a transit post 1 functioning as a switching hub can always administer a present position of the optical node RN1.

Let's suppose a situation that the mobile object 2 is moving in a direction from the optical repeater AP2 to the optical repeater AP1 and presently situated between a zone c and zone d as shown in FIG. 2. When a space between a left boundary of the downward communication area and a left boundary of the upward communication area is 50 cm and when a maximum moving speed of the mobile object 2 is 25 cm/s, at least two seconds are left before a downward transfer from the optical repeater AP2 does not arrive at the optical node RN1 any more. In this situation, if the transit post 1 transmits a frame to the optical repeater AP2, the frame can arrive at the optical node RN1.

If upward frames are emitted from the optical node RN1 positioned in zone c every minute, emitted signals do not arrive at the optical repeater AP2, but arrive at the optical repeater AP1 without fail. As a result, an address table in the transit post 1 is rewritten without fail. Since the downward communication area is set wider than the upward communication area, such communication troubles as in the conventional systems described above do not occur in the network system by the present invention. As mentioned above, since there is a significant relation between photo-detecting/emitting capability and communication areas, the moving speed of the optical node RN and the like, it is necessary to set these factors properly in order to attain features of the present invention effectively.

In other zones except zone c, bilateral communication can be performed without fail as in the conventional system.

In the above-mentioned embodiment the transit post 1 is explained as a network component which administrates a plurality of the optical repeaters AP1 and AP2. However, it is possible to arrange a distributed constitution where functions of the switching hub can be built in wired ports of the respective optical repeaters AP1 and AP2.

As explained above, even when the optical repeaters and optical node have wide photo-detecting/emitting directional angles, address information in the address table is prevented from vanishing along with a movement of the optical node. The present embodiment can maintain the mobile object and the wireless optical network in the same way as in the wired network.

Further the wireless network by the present embodiment works normally even when communication areas of a plurality of the optical repeaters are overlapped.

(Embodiment 2)

The present embodiment is different in the following feature such that a filtering function is added to the transit post, from embodiment 1. Explanations on other functions of the present embodiment same as the embodiment 1 are omitted, and mainly different features of the present embodiment are explained.

In the present embodiment, photo-detecting/emitting areas of the optical repeaters and the optical node are set wide directional angles. A plurality of the optical repeaters are arranged such that the photo-detecting/emitting areas of neighbor optical repeaters are overlapped each other, as satisfying the following conditions.

Addresses in an address table are prevented from vanishing, while the a moving object equipped with optical node is moving so that the same functions as in a wired network are kept in the present wireless network.

Problems mentioned in "Brief Description of the Prior Art" occurring in overlapped areas are solved so that the wireless network performs normally even when photo-detecting/emitting areas of a plurality of optical repeaters are overlapped.

Duplications of unnecessary frames are prevented so as to prevent network performance from deteriorating.

In order to attain the above-mentioned conditions, the present embodiment is constituted as follows.

A downward transmitting area is always set wider than an upward transmitting area. In other words, if the upward communication is transmissible, the downward communication is transmissible without fail.

Frames are emitted (transmitted) from the optical node of the mobile object periodically, so as to track the mobile object which moves even at its maximum speed. A periodical emitting interval is determined by taking the maximum speed of the mobile object and an extent of the overlapped areas of the optical repeaters into consideration. The overlapped extent may be determined by taking the maximum speed and the size of the transmitting area into consideration.

The filtering function is constituted in the network system so as to prevent continuous frames with the same content from transmitting from the mobile object to a wired network.

Figure 3:
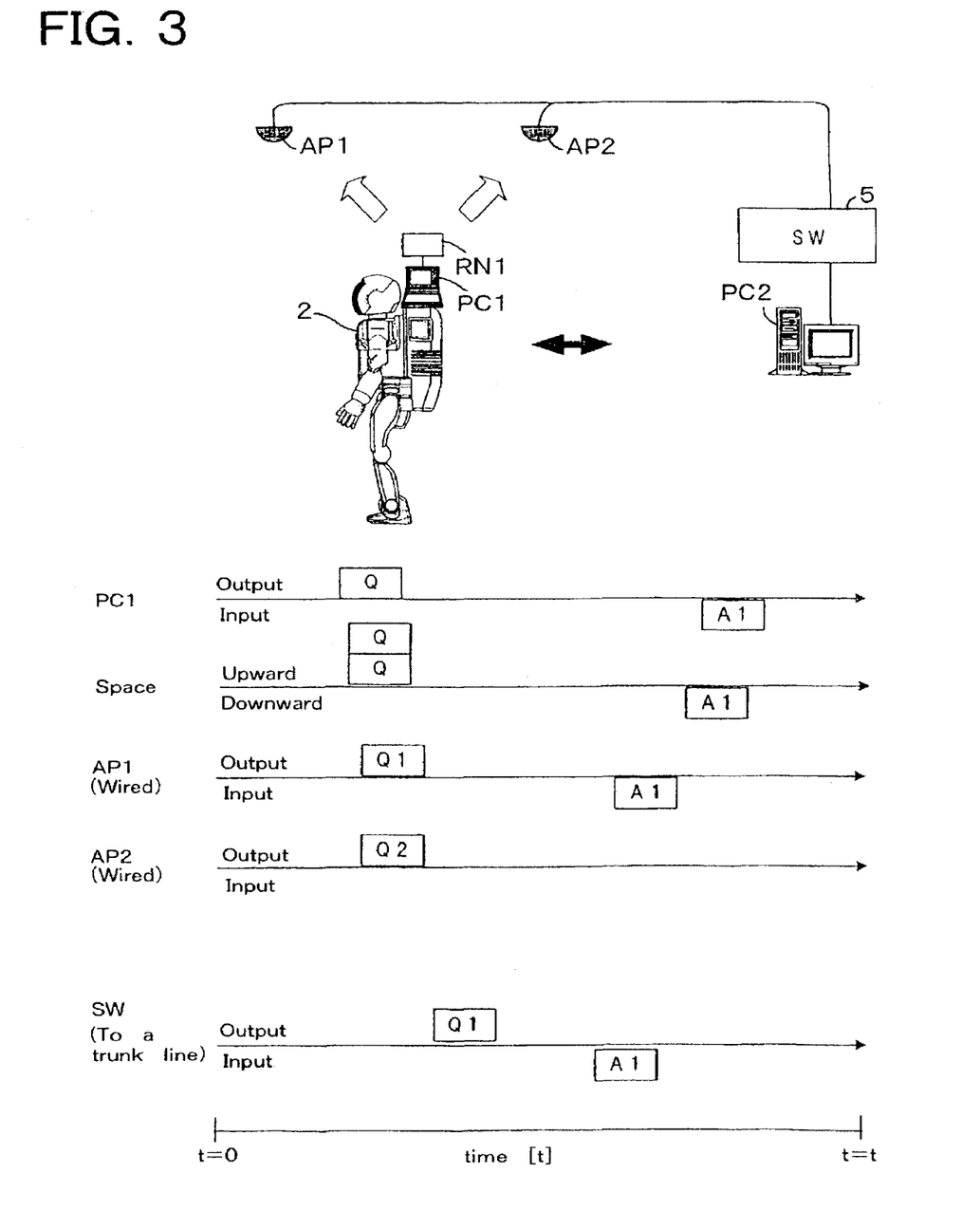
FIG. 3 shows an example of network communication by embodiment 2 of the present invention.

Hereinafter the above-mentioned filtering function is explained. FIG. 3 illustrates a communicating status by the present embodiment. A transit post 5 by the present embodiment is constituted as a switching hub equipped with a filter, which is not arranged in the conventional system shown in FIG. 10. The filtering function has the following features.

When a plurality of continuous frames with the same content from the optical repeaters AP1 and AP2 upward to the trunk line are arrived at the filter, only one frame is passed and other frames are discarded. The address administration table is renewed by information on a passed route of the frame.

In the Ethernet® most frequently used as an ordinary LAN, an error check sequence called FCS (Frame Check Sequence) (or called CRC: Cyclic Redundancy Check) with a size of 32 bits, is added to the ends of all frames. An FCS value is calculated based on past data up to now. Even if past data are different to one another, it is quite rarely probable to have the same FCS values to one another.

A usually used protocol such as TCP/IP is administered by a frame number, which is renewed whenever a frame is transmitted. In other words, even if frames with the same content are continuously transmitted from the same computer, possibilities to transmit the same FCS values continuously are extremely low, since frame numbers are different.

In this context, the transit post 5 equipped with filter by the present embodiment can prevent redundant unnecessary frames by checking the above-mentioned FCS values and by eliminating continuous frames which have the same FCS value as that of the last time passed upward frame. On the other hand the address administration table is set not to be renewed by eliminated frames.

Figure 4:
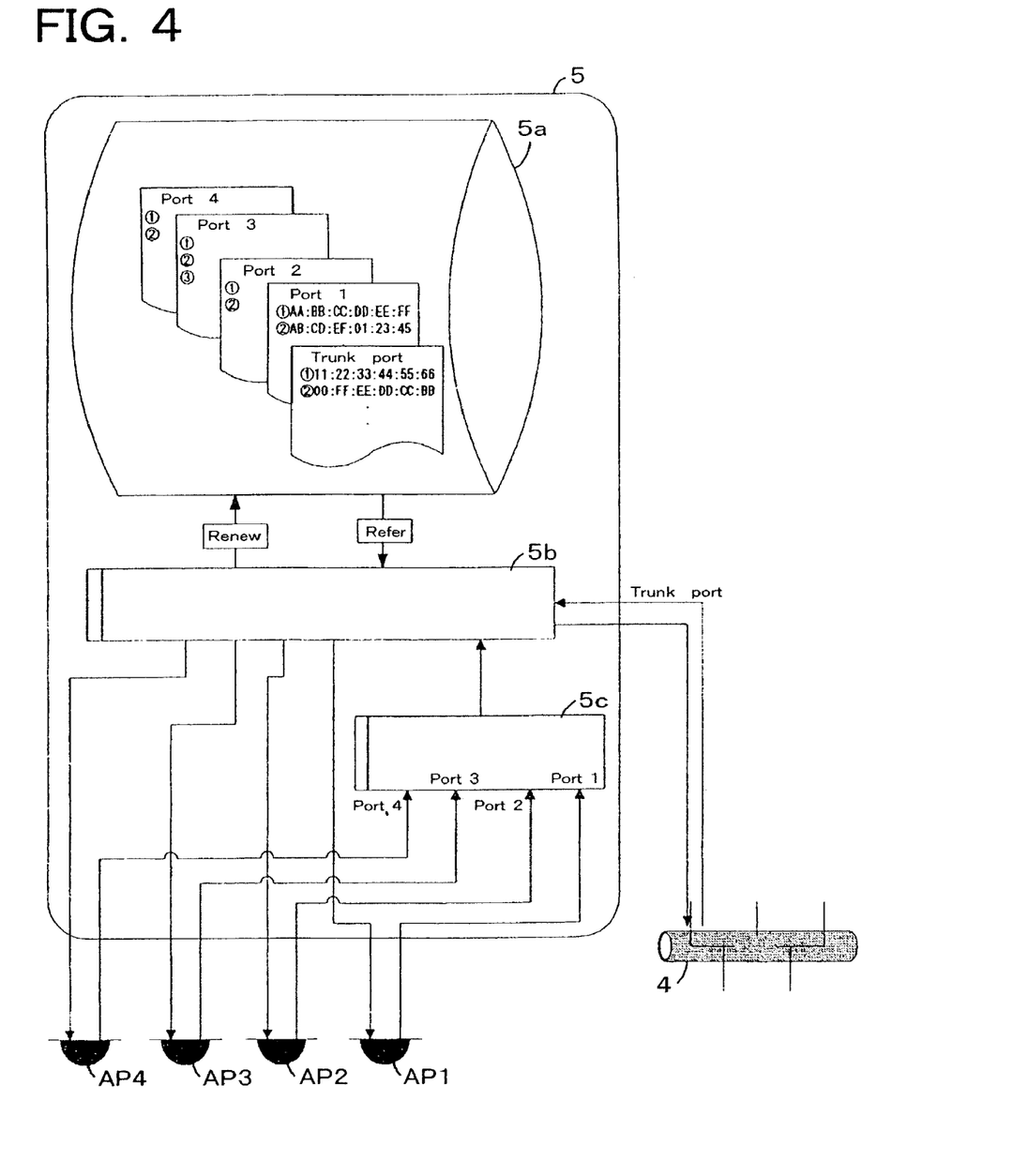
FIG. 4 is a block diagram showing a functional structure of a switching hub by embodiment 2.

FIG. 4 shows the function structure of the transit post 5 functioning as a switching hub by the present embodiment. In addition to an address administration table 5*a* and a frame sorting unit 5*b*, a filter unit 5*c* is arranged in the transit post 5, when compared with the conventional transit post shown in FIG. 11. Upward frames from respective optical repeaters AP1 to AP4 are always supplied to the frame sorting unit 5*b* via the filter unit 5*c*.

Figure 5:
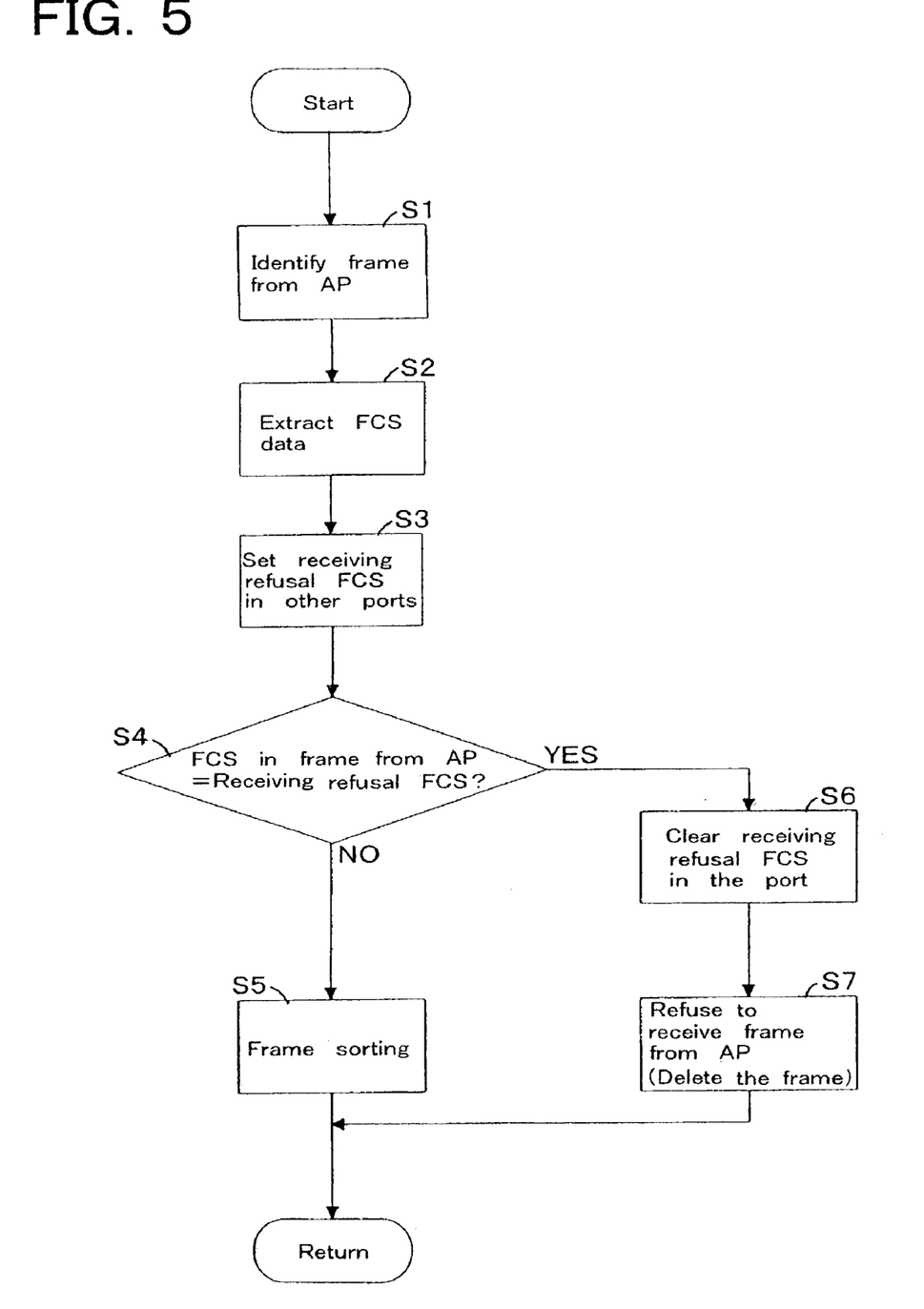
FIG. 5 is a flow chart showing an example of filtering processes by embodiment 2.

FIG. 5 is the flow chart illustrating an example of filtering processes. Received frames are processed by a microprocessor equipped in the transit post 5. Even when frames are received simultaneously, the microprocessor does not process simultaneously, but processes frames sequentially one by one.

Hereinafter operational functions of the filter unit 5*c* are explained by referring to FIGS. 4 and 5. Here let's suppose a situation that an upward frame from the optical node RN1 on the mobile object 2 is received by both optical repeaters AP1 and AP2, and the frame received by the optical repeater AP1 is processed previously. When the frame from the optical repeater AP1 is received by a port 1 and the received frame is identified (S1 in FIG. 5), FCS data of the frame is extracted (S2). Instructions to refuse the received frame by port 1 are set other ports (in the present embodiment ports 2, 3 and 4). In other words the FCS data of port 1 is set as a receiving refusal FCS data by other ports (S3). As a result, the upward frame from optical node RN1 received by the optical repeater AP2 is deleted, and other ports including the trunk line refuse to receive frames.

The FCS data of the received frame is compared with a receiving refusal FCS data in the received port (here port 1) (S4). If the FCS data does not coincide with the receiving refusal FCS data, the received frame is sent to the frame sorting unit 5*b* (S5). If the FCS data coincides with the receiving refusal FCS data, the receiving refusal FCS data is cleared and the frame sorting unit 5*b* refuses to receive the sent frame (namely the sent frame is deleted).

In the above-mentioned embodiment, the transit post 5 is explained as a network device having a function of administrating the optical repeaters AP1 and AP2. However, a distributed network system where the optical repeaters AP1 and AP2 respectively equipped with switching hubs on their wired ports, can be possible.

In the distributed network system, if a plurality of the optical repeaters are situated in a communication range of an optical node (or a computer), administration information of information table in the optical node (or a computer) can be exchanged among the optical repeaters in the communication range. And upward frames from one optical node identified in other optical repeaters, are deleted.

As described above, the present embodiment can prevent transfer performance from deteriorating without increasing the number of transferred frames. Even if photo-detecting/emitting directional angles of the optical repeaters and the optical nodes are set wide, addresses are prevented from vanishing from the address table while the optical nodes are moving and the mobile object and the network are maintained same as the wired network.

Figure 12:
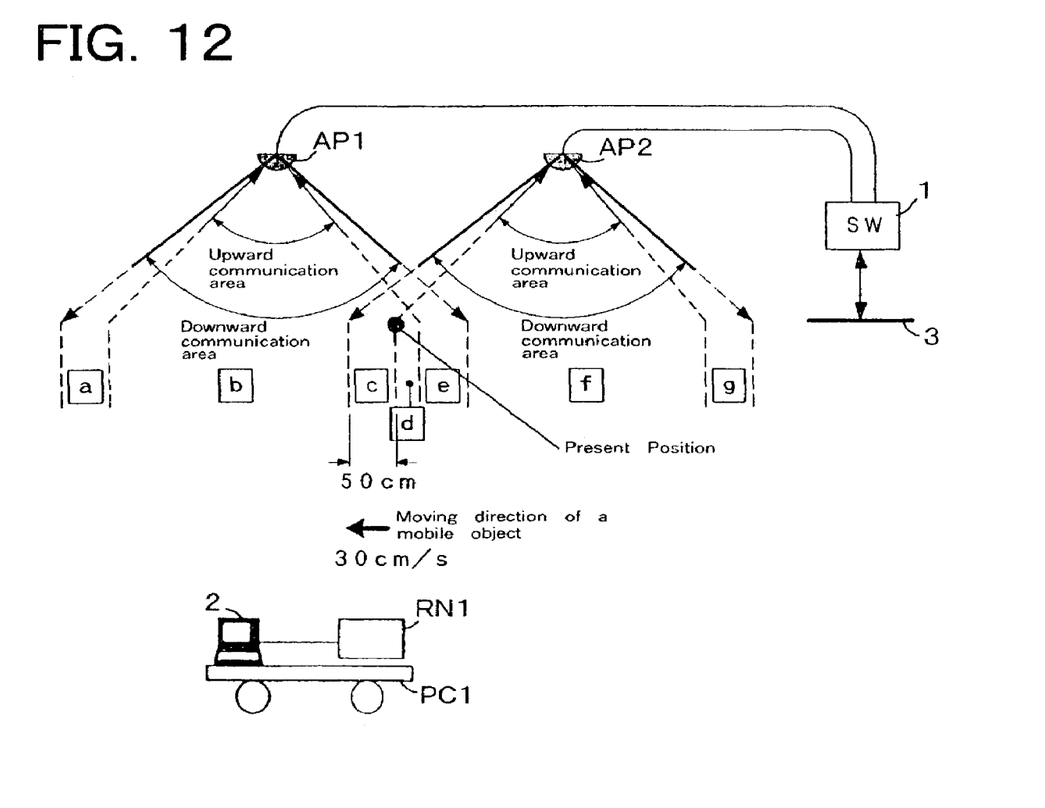
FIG. 12 is a view illustrating other embodiment where a mobile object is a vehicle equipped with an optical node.

The mobile object 2 on which the optical node RN is mounted, is not limited to the robot as shown in FIGS. 2, 3 and 8, the present invention is applicable to other mobile objects such as a vehicle, an airplane or the like which performs wireless communication. An example illustrated in FIG. 12, a vehicle is employed as the mobile object. The number of the optical nodes and optical repeaters are not limited to examples shown in FIGS. 2, 5 and 8, but other numbers of the optical nodes and repeaters are employable.

What is claimed is:

1. An optical wireless communication system equipped with a mobile object and a wired network for constituting a bilaterally communicating network comprising:

a transit post having a function to switch information frames;

a plurality of optical repeaters each having a communication area and connected to said transit post; and a mobile optical node bilaterally communicating with said optical repeaters, wherein:

a communication area from each of said optical repeaters to said optical node is set wider than a communication area from said optical node to each of said optical repeaters such that the latter communication area is included in the former communication area; and each communication area of said optical repeaters is arranged so as to overlap the other communication areas in a predetermined zone.

2. The optical wireless communication system according to claim 1, wherein: information frames including address information of said optical node are periodically transmitted from an information processor connected with said optical node to said optical repeaters via wireless optical transmission.

3. An optical wireless communication system equipped with a mobile object and a wired network for constituting a bilaterally communicating network comprising:

a transit post having a function to switch information frames containing error check sequences therein;

a plurality of optical repeaters each having a communication area and connected with said transit post, and a mobile optical node bilaterally communicating with said optical repeaters, wherein:

the communication area of each said optical repeaters is arranged so as to overlap the other communication areas in a predetermined zone; and information frames including address information of said optical node are periodically transmitted from an information processor connected with said optical node to said optical repeaters via wireless optical transmission;

said transit post has a filter function for comparing present to prior frames in successive error check sequences so as to make only one information frame effective among frames with the same content from said optical repeaters to a trunk communication network, if the same content is repeated in said error check sequences when said error check sequences are compared.

4. The optical wireless communication system according to claim 3, wherein:

each communication area from said optical repeaters to said optical node is set wider than a communication area from said optical node to each of said optical repeaters such that the latter communication area is included in the former communication area.

5. An optical wireless communication system equipped with a mobile object and a wired network for constituting a bilaterally communicating network comprising:

a mobile optical node;

a plurality of optical repeaters bilaterally communicating with said mobile optical node; and a transit post having a function to switch information frames and exchanging information between said plurality of repeaters and a trunk communication network; wherein:

a photo-emitting area of each said optical repeaters is set outwardly wider than a photo-detecting area of each said optical repeaters;

said transit post comprises a filter unit for passing one frame with the same content from each said repeaters among information frames;

an administration table for registering and administrating addresses of the information frames on each said optical repeaters and said optical node; and a frame sorting unit for refusing the passed frame when an FCS (frame check sequence) data of the frame is the same as a receiving refusal FCS data.

6. The optical wireless communication system according to claim 5, wherein:

each communication area of said optical repeaters is arranged so as to overlap to other communication areas in a predetermined zone.

* * * * *